(12) United States Patent
Verma et al.

(10) Patent No.: US 10,819,842 B2
(45) Date of Patent: Oct. 27, 2020

(54) PROVIDING ON-DEMAND ACCESS TO A RESTRICTED RESOURCE OF A USER DEVICE

(71) Applicant: VMware, Inc., Palo Alto, CA (US)

(72) Inventors: Gaurav Verma, Bangalore (IN); Manjunath Subramani, Bangalore (IN); Suchit Shivashankar, Bangalore (IN); Karthikeyan Palanisamy, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/038,458

(22) Filed: Jul. 18, 2018

(65) Prior Publication Data
US 2020/0028960 A1    Jan. 23, 2020

(51) Int. Cl.
*H04L 29/06*    (2006.01)
*H04L 29/08*    (2006.01)
*H04M 1/725*    (2006.01)
*H04W 48/02*    (2009.01)
*H04W 48/14*    (2009.01)
*H04W 48/16*    (2009.01)

(52) U.S. Cl.
CPC ...... *H04M 1/72577* (2013.01); *H04L 63/108* (2013.01); *H04L 67/306* (2013.01); *H04W 48/02* (2013.01); *H04W 48/14* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 9,391,995 B2* | 7/2016 | Stuntebeck | H04L 63/102 |
| 2011/0153724 A1* | 6/2011 | Raja | H04L 67/325 |
| | | | 709/203 |
| 2016/0021199 A1* | 1/2016 | Krimon | H04L 67/18 |
| | | | 709/225 |
| 2018/0139600 A1* | 5/2018 | Kim | H04W 56/0015 |

\* cited by examiner

*Primary Examiner* — Gary Lafontant
(74) *Attorney, Agent, or Firm* — Clayton, McKay & Bailey, PC (57) ABSTRACT

Examples described herein include systems and methods for providing on-demand access to a restricted resource of a user device. An example method can include generating a profile that specifies a restricted resource and one or more conditions for that resource to be de-restricted. The profile can be sent to, and utilized by, an agent application executing on the user device. The agent application can determine that a user is requesting de-restriction of a resource and determine whether all applicable conditions are met. If the conditions are met, the agent application can de-restrict the resource. After the resource is used, the agent application can report details of the use to an administrator or management server.

17 Claims, 10 Drawing Sheets

PROVIDING ON-DEMAND ACCESS TO A RESTRICTED RESOURCE OF A USER DEVICE

BACKGROUND

Organizations can deploy Enterprise Mobility Management ("EMM") or Mobile Device Management ("MDM") systems that allow employees to use mobile devices to securely access corporate information and improve productivity. These systems typically require a mobile device to be "enrolled" into the system. Enrollment can include installation of software on the mobile device that allows aspects of the mobile device to be controlled by an administrator.

For example, an administrator can implement restrictions on a device that limit features or functionality of the device. The restrictions can relate to hardware, software, or a combination of both (collectively referred to as "resources" throughout). For example, restrictions can limit the functionality of calling, data usage, SMS, WIFI, camera, near-field communication ("NFC") devices, or the use of an application. The restrictions can be based on aspects of the user (such as a user group that the user belongs to), or aspects of the device (such as the geographical location of the device or the battery level of the device).

In some circumstances, such as emergencies or urgent business situations, a user may determine that they need access to a restricted resource associated with their user device. To gain access, the user would need to contact an administrator and request access to that resource. The administrator would then need to manually configure the user's device to allow access to the restricted resource. In some examples, the administrator would also need to manually revoke access to the restricted resource once the user. Meanwhile, the administrator would have little knowledge regarding how the user utilized the de-restricted resource. The process can also be time consuming—especially if the user makes the request outside of work hours—and the urgent need can pass before the user ever receives the requested access.

As a result, a need exists for systems and methods for providing timely, on-demand access to a restricted resource on a user device.

SUMMARY

Examples described herein include systems and methods for providing on-demand access to a restricted resource of a user device. An example method includes generating a profile at a management server. The profile can specify one or more restricted resources of the user device as well as conditions for the restricted resource(s) to be de-restricted. The example method can include transmitting the profile to the user device.

The profile can be utilized by an agent application that executes on the user device. In the example method, the agent application can be instructed to determine that a user of the user device is requesting de-restriction of the restricted resource(s). In response to that determination, the agent application can confirm that any application conditions are satisfied. The agent application can inform the user of any steps that need to be taken to meet those conditions, such as by providing visual cues on a user interface associated with the agent application. The example method can also include prompting the user to agree to an agreement before the agent application de-restricts the resource.

Once the agent application confirms that the conditions are met, it can de-restrict the resource and allow access to the user. The agent application can impose a time limit on de-restricted use of the resource, if instructed by the management server.

After the user makes use of the de-restricted resource, the agent application can send a communication to the management server identifying the user device and the requested de-restriction. The agent application can also provide additional information such as the amount of time spent using the de-restricted resource. This information can be provided to an administrator in some examples, such as by SMS or email.

The examples summarized above can be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for providing on-demand access to a restricted resource of a user device. An example method can include generating a profile that specifies a restricted resource and one or more conditions for that resource to be de-restricted. The profile can be sent to, and utilized by, an agent application executing on the user device. The agent application can determine that a user is requesting de-restriction of a resource and determine whether all applicable conditions are met. If the conditions are met, the agent application can de-restrict the resource. After the resource is used, the agent application can report details of the use to an administrator or management server.

Figure 1:
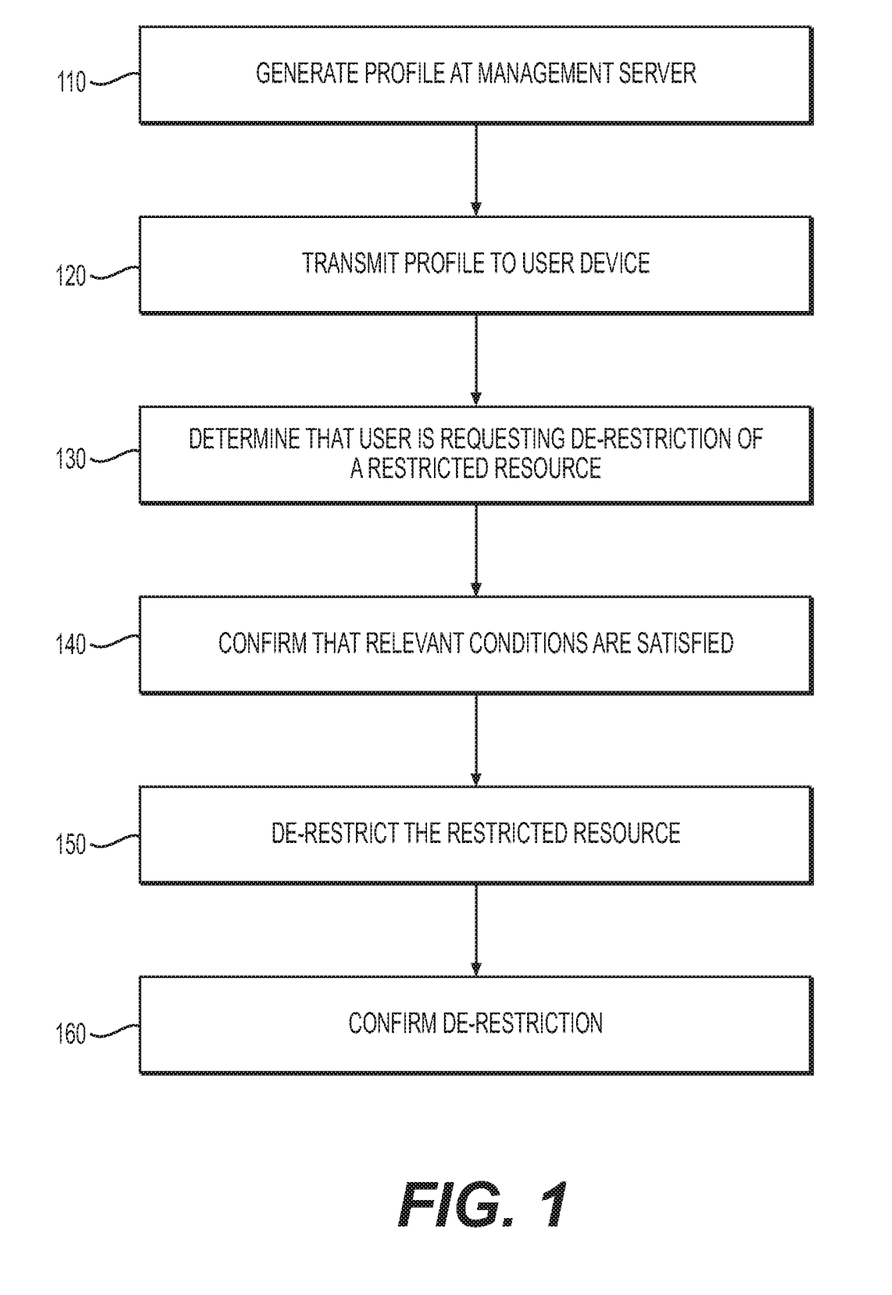
FIG. 1 is a flowchart of an example method for providing on-demand access to a restricted resource of a user device.
Figure 2:
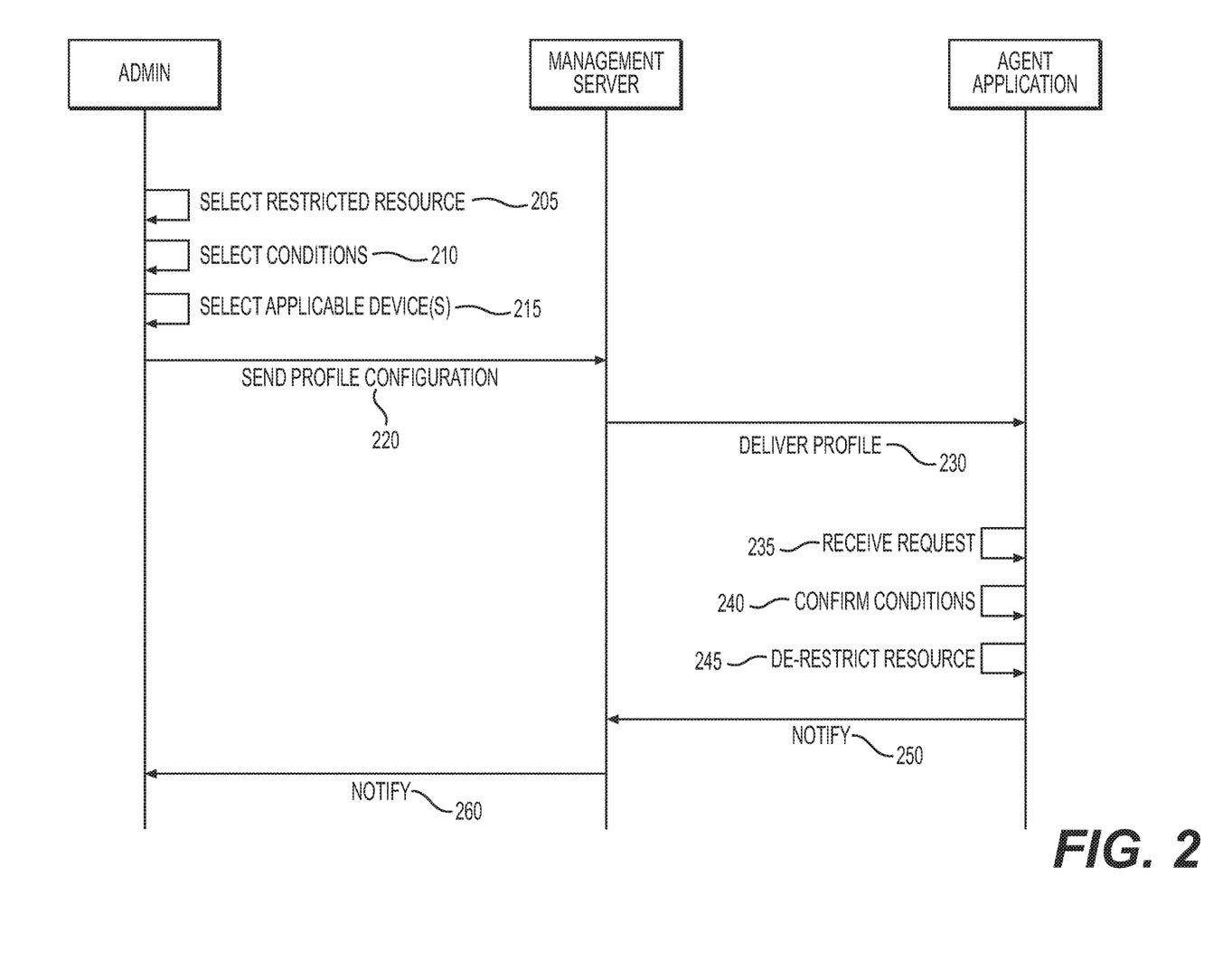
FIG. 2 is a sequence diagram of an example method for providing on-demand access to a restricted resource of a user device.
Figure 8:
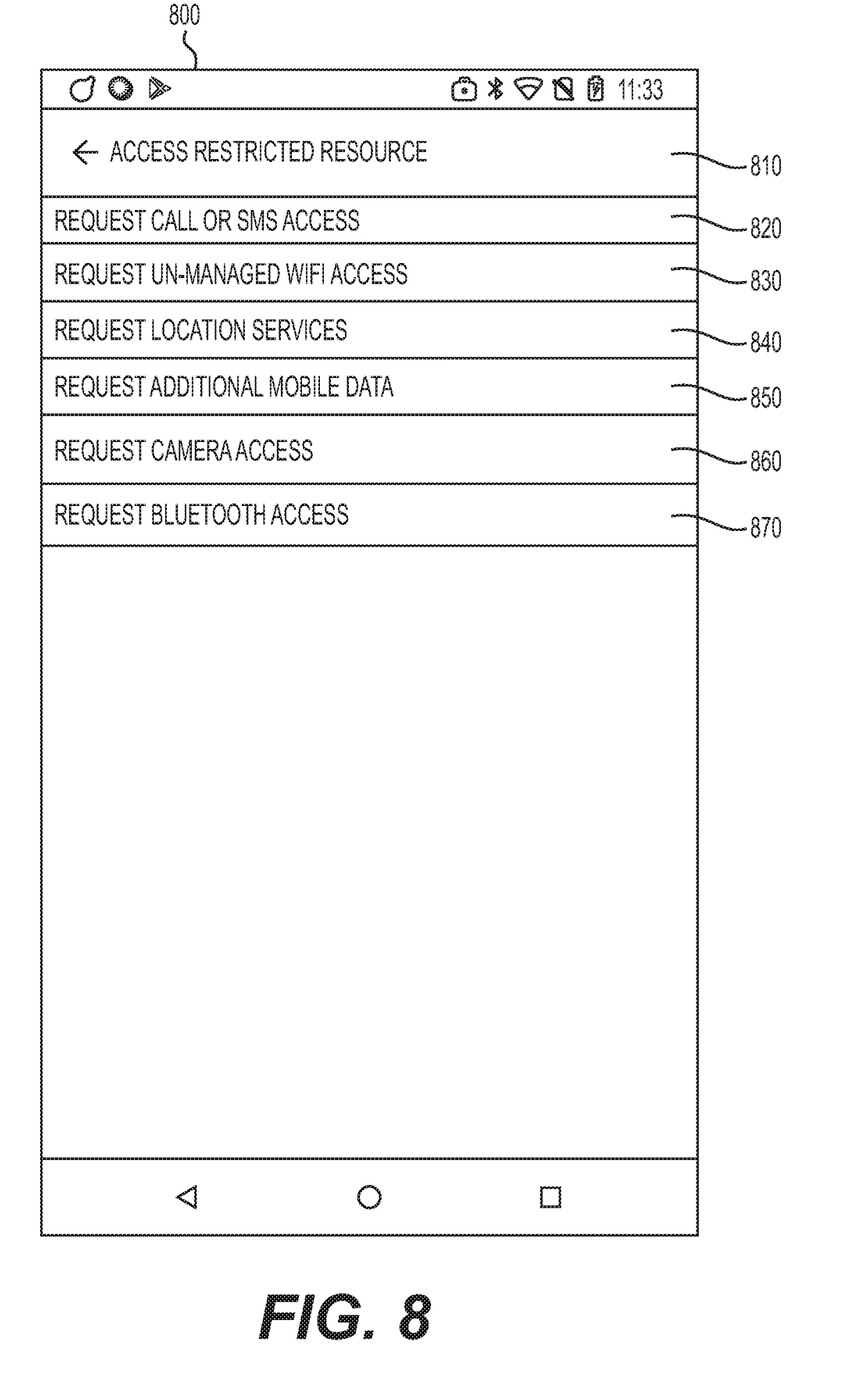
FIG. 8 is an illustration of an example user interface for selecting a restricted resource for which a user requests access.
Figure 9:
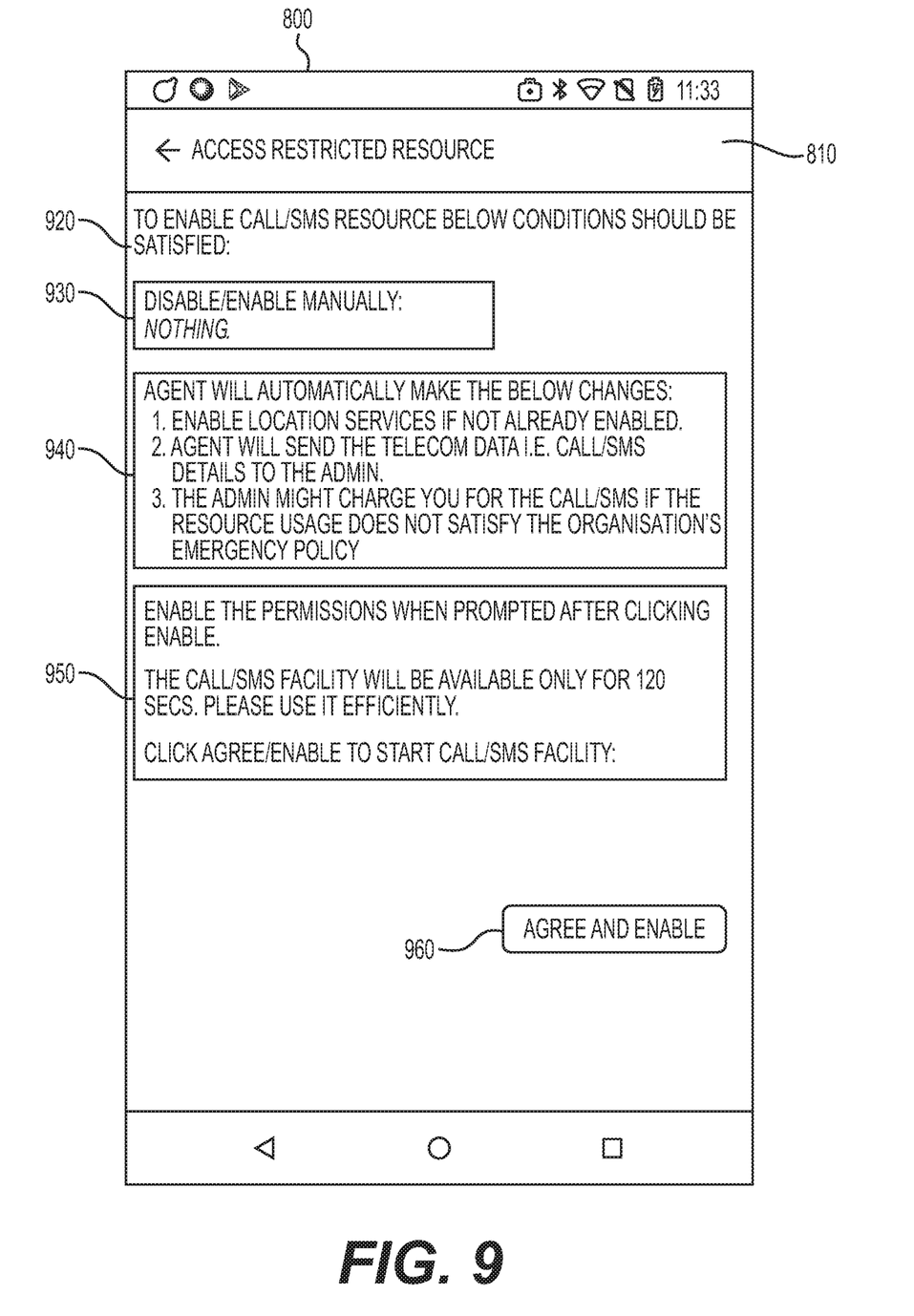
FIG. 9 is an illustration of an example user interface for displaying conditions precedent to de-restricting a resource.
Figure 10:
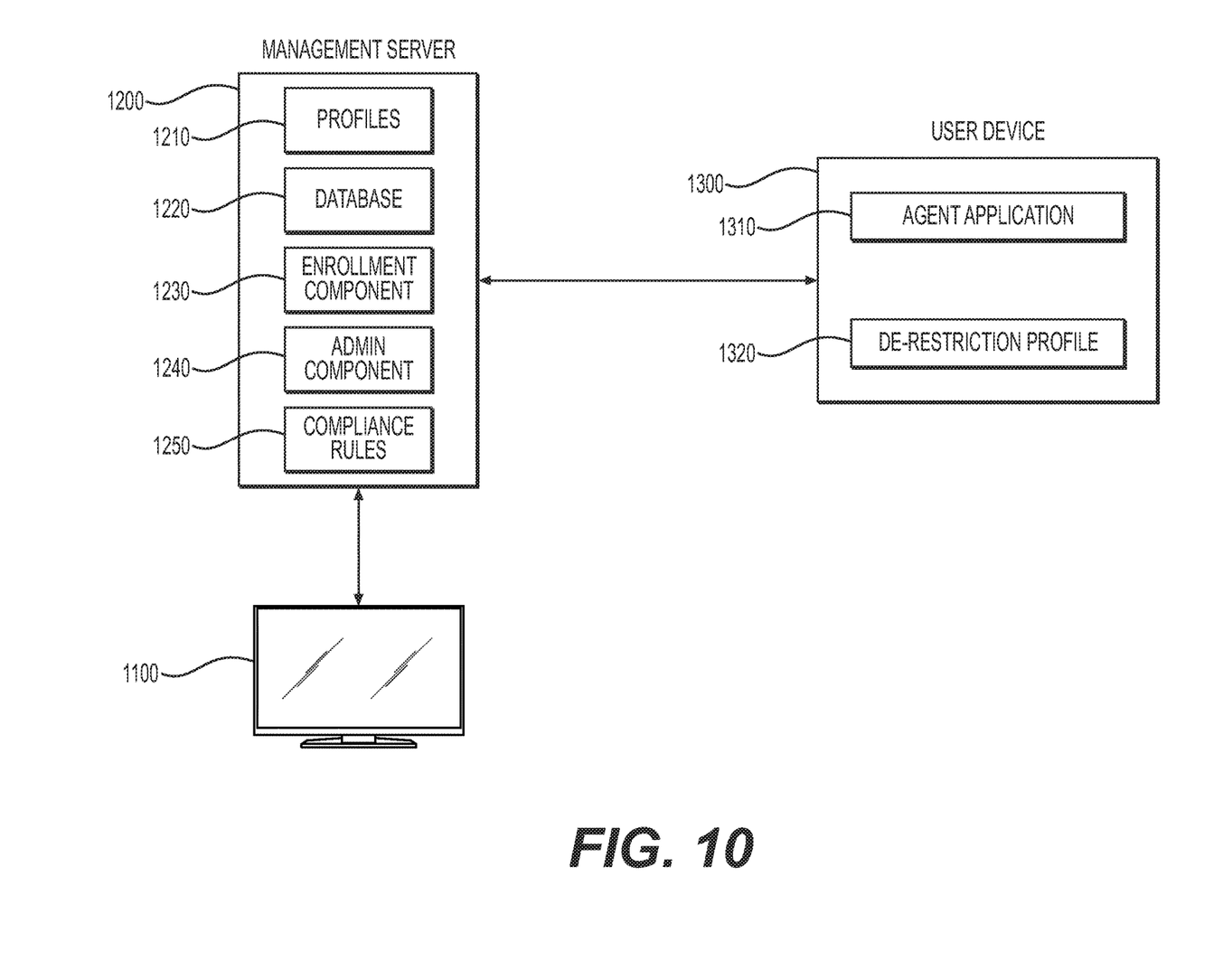
FIG. 10 is an illustration of an example system configured to carry out exemplary methods provided herein.

FIG. 1 provides a flowchart of an example method for providing on-demand access to a restricted resource of a user device. FIG. 2 provides a sequence diagram of a more detailed example method providing on-demand access to a restricted resource of a user device. FIGS. 3-7 provide illustrations of an example user interface for configuring and deploying a profile for providing on-demand access to a restricted resource of a user device. FIGS. 8 and 9 provide illustrations of an example user interface for requesting access to a restricted resource at the user device. FIG. 10 provides an illustration of an example system for carrying out the disclosed methods.

Turning to the example method of FIG. 1, stage 110 can include generating a profile at a management server. The profile can be generated by an administrator of an enterprise, for example. The administrator can access a console that includes a user interface providing various options for configuring a profile or performing other options. The console can communicate with the management server through a backend process that facilitates such communication. The administrator can create the profile by selecting options at the console and publishing the profile for provisioning.

The profile can relate to one or more user devices. A user device can be any type of computing device and can include, for example, a processor and a memory store. The processor can execute non-transitory instructions stored in the memory store. The user device can also include various hardware accessories such as a camera, microphone, speaker, accelerometer, gyroscope, GPS transmitter, wireless-internet transmitter, NFC transmitter, or other hardware. The user device can execute an operating system that manages system resources and other software installed on the device. The user device can also execute software applications. Common examples of a user device include, but are not limited to, mobile telephones, computers, laptops, tablets, or watches.

The profile can specify a restricted resource of the user device. A restricted resource can include any feature or functionality of a user device that is restricted in some way. The restrictions can relate to hardware or software of the user device, or a combination of both. For example, restrictions can limit the functionality of calling, data usage, SMS, WIFI, camera, NFC devices, or the use of an application. The restrictions can be based on aspects of the user (such as a user group that the user belongs to), or aspects of the device (such as the geographical location of the device or the battery level of the device). An example of a restricted resource can include, for example, the camera not being operable when the user device is located within a highly confidential portion of an enterprise. As another example, when a specified application executes, the agent can restrict resources of the user device to ensure security of files or data used by the application.

A user device can be managed by a management server. The user device can be enrolled with the management server, turning over control of certain functionality to the management server. The management server can implement that control over the user device in a variety of ways, including using an agent application which is controlled by the management server and which executes on the user device. The process of enrollment and management of user devices is explained in more detail with respect to FIG. 10.

Turning back to stage 110, the administrator can select a restricted resource of the user device at the console. For that selected restricted resource, the administrator can select a condition, or set of conditions, under which the restricted resource can be de-restricted. The administrator can also set limitations on use of the de-restricted resource, such as a time limit, an available number of de-restricted uses, a geographic limitation, or any other limitation. Saving or publishing the profile through the console can cause the management server to generate a profile matching the specifications received from the administrator. The process of creating a profile and selecting restrictions is discussed in more detail with respect to FIGS. 2-7.

Stage 120 of the example method can include transmitting the profile to the user device. This stage can include instructing the management server to transmit the profile to one or more user devices. In some examples, an administrator can create a profile that applies to a single user device. In other examples, the administrator can create a profile that applies to multiple user devices, such as a group of users or user devices. Various groups available to an administrator can be saved at the management server. Alternatively, the administrator can create a new group to which the profile should apply. In one example, the console allows the administrator to select between various groups already saved at the management server.

As part of stage 120, the management server can transmit the profile to a relevant user device. The profile can be stored by an agent application executing on the user device. The agent application can implement instructions within the profile, as specified. For example, the agent application can control the de-restriction of restricted resources, as explained in more detail below.

The term "transmit" is not intended to be limited to physically sending the profile to the user device. In some examples, the profile can be stored at a location accessible to the user device, and the user device can retrieve the profile. For example, the profile can be stored in a command queue associated with the user device, such as at a management server. An instruction can then be transmitted to a messaging service associated with the platform of the target user device. The instruction can request that the messaging service send an instruction to the user device to check in with the management server or otherwise determine whether the command queue contains any commands or instructions. If the profile is stored in, or identified by, the command queue, the user device can retrieve it by downloading and executing the contents of the command queue.

Stage 130 can include determining that a user of the user device is requesting de-restriction of the restricted resource. Stage 130 can be performed by the user device, such as by an agent application executing on the user device. In one example, the agent application provides a user interface with one or more options allowing the user to request de-restriction of a restricted resource. In another example, the user device can display a window or other prompt when the user attempts to utilize a restricted resource. The window or prompt can include an option to request de-restriction, either directly or by rerouting the user to the user interface associated with the agent application.

Stage 140 can include confirming that any conditions specified by the profile are satisfied. The conditions can relate to hardware aspects of the device, such as a condition requiring that the processor and memory chips within the user device have not been altered or replaced. The conditions can also relate to software aspects of the device, such as a condition requiring that the device include a particular version of an operating system or requiring that the device not include a hostile application. The conditions can also include a combination of hardware and software requirements, such as a set of conditions requiring that the battery level of the device is above a certain threshold and also requiring that the device includes a camera.

At stage 150, in response to confirming that the relevant conditions are satisfied, the user device can de-restrict the restricted resource. For example, the agent application can lift a restriction preventing the operating system from performing a particular action. In another example, the agent application can instruct the operating system to allow or perform an action that would otherwise not be allowed. The phrase "in response to" is not intended to be limiting. For example, stage 150 can merely be performed in an instance in which the relevant conditions are satisfied, rather than directly "in response to" the conditions being satisfied.

An agent application can determine whether a condition is satisfied. For example, the agent application can be registered as a device administrator or can otherwise have administrator-level privileges for accessing, retrieving, adding, deleting, or modifying information on the device or related to the device or to the user. The agent application can also have privileges for communicating with the operating system that is executing on the device. For example, to confirm that a condition is satisfied, the agent application can obtain information from the operating system about the current state of the device. This information can include any information about the device, including the hardware, firmware, or software currently or previously included on the device, the location of the device, the battery level of the device, or any other information describing a state of the device. This information can be stored or otherwise available to the agent application. The agent application can access the information, compare it to a relevant condition, and determine whether the condition has been met.

To provide a more specific example, suppose a user requests access to a camera of the user device. In this example, an agent application on the user device prevents the camera functionality while the user device is within a mile of an enterprise location. The user may be requesting the camera to take a picture of an automobile accident that occurred in the parking lot. The user device can confirm that any required conditions are met—in this example, the condition being that the user device is not in a confidential area of the enterprise, such as a production line where products are manufactured. Because the user is in the parking lot rather than the confidential area, the agent application can confirm that the condition is met and de-restrict the camera. The user can then utilize the camera as specified in the profile, such as by having five minutes of unrestricted use.

Stage 160 can include confirming the de-restriction. By tracking the de-restrictions, an enterprise can ensure that de-restriction policies are not being abused. This can include sending a communication to the management server, or to an administrator or other individual, identifying the user device and requested de-restriction. Stage 160 can be performed by sending a message, such as an email or SMS, to the administrator. It can alternatively, or additionally, be performed by sending a message to the management server, which can display the information in the console or provide the information to the administrator in another manner. In some examples, this stage can also include sending a communication to the user, such as by generating an email to the user summarizing the de-restriction.

The communication can also identify the user of the user device. It can also include supporting or contextual information. Continuing the example above involving de-restriction of the camera, the communication could identify the user, the user device, the request to use the restricted camera functionality, the successful de-restriction of the camera functionality, and the number of pictures or videos taken using the camera in the de-restricted state. In some examples, the pictures or videos themselves can be provided to the management server or administrator. Additionally, the communication at stage 160 can include information regarding previous requests for de-restriction of resources.

Providing this information at stage 160 can give an enterprise protection against abuse of the automated de-restriction feature. For example, if an administrator receives information indicating that the user requests de-restriction of a cellular-data resource too frequently (such as multiple times per week), the administrator can take corrective action. The administrator could reach out to the user directly, turn off all de-restriction services by revoking the profile, or modify the profile to include additional limitations.

Stage 160 can include using a computing architecture to cause a message to be sent to an administrator, the message describing the de-restriction of the resource. For example, the agent application that executes on the device and performs stages (such as stages 140 and 150) can cause a message to be sent to an administrator. The agent application can utilize any functionalities of the device to send the message. For example, the agent application can cause a message to be sent using an application on the device, such as an email or messenger client. The agent application can also use a wireless transmitter of the device to, for example, connect to a server or web location over the internet. In one example, the agent connects to a server, such as a management server or communication server, and provides a message with instructions to send the message to an administrator or otherwise allow the administrator to receive the message.

FIG. 2 provides a sequence diagram of an example method for providing on-demand access to a restricted resource of a user device. At stage 205 of the method, an administrator can select a restricted resource through a console associated with a management server. The console can provide a user interface, such as that shown at FIG. 3, through which the administrator can select between relevant restricted resources. In some examples, a drop-down menu is provided, listing all restricted resources. The menu can be specific to a user device, or a group of user devices, by only displaying those resources restricted at the relevant user device(s). In another example, the menu can include all potential restricted resources. At stage 205, the administrator can select one or more of the restricted resources displayed.

At stage 210, the administrator can select conditions necessary for the selected restricted resource to be de-restricted. The conditions can include any settings or configurations necessary at the device to de-restrict the selected resource. Examples of these types of conditions include the operating system type and version executing on the device matching a predetermined type, the device type matching a predetermined type, and the battery level being above a threshold amount. Conditions can also include requirements set by the administrator. Examples of these conditions can include the geographic location of the device, whether the requested de-restriction was requested more than a threshold number of times within a threshold period of time, and whether the device is compliant with any applicable compliance rules (discussed in more detail with respect to FIG. 10). The conditions can also include whether particular applications are executing at the user device.

At stage 215, the administrator can select all devices applicable to the particular de-restriction profile being configured. In some examples, stage 215 can occur prior to stages 205 or 210. In those examples, any options presented at stages 205 or 210 can be tailored to the devices selected at stage 215. The devices can be selected based on any available criteria available at the management server. In one example, the administrator can select devices individually, either by identifying the devices themselves or the users associated with those devices. The administrator can also identify devices by device type. For example, the administrator can select all enrolled devices from a certain manufacturer or having the same model number. The administrator can alternatively select devices based on the operating system running on the device, such as by selecting all iOS devices or all ANDROID devices. The administrator can further specify devices based on the version of the operating system on the device.

In addition to the options listed above, at stage 215 the administrator can select devices based on groups, such as user groups, device groups, smart groups, or any other type of group that includes at least one device or user. A user group can include, for example, all users within the same department or hierarchical level. Examples of such user groups can include an accounting group that includes the members of an accounting department within the enterprise, a legal group that includes the members of a legal department within the enterprise, and an executive group that includes the executives within the enterprise. When the selected group includes users, rather than user devices, the management server can map those users to their respective user devices. The administrator can therefore select groups based on users, user devices, or a combination of both.

In some examples, the applicable devices selected at stage 215 include selections of multiple groups. An administrator can, for example, select the accounting group (comprising all users in the accounting department) and further select those devices within the accounting group that are currently running iOS version 11 or higher. In another example, the administrator can select all devices running the ANDROID operating system and associated with users on a certain floor of an office building associated with the enterprise. These examples are not exhaustive. The administrator can mix and match any number of groups and device requirements at stage 215 in order to specify the devices applicable to the on-demand de-restriction of resources.

After the administrator has selected the applicable devices, restricted resource to be de-restricted, and any conditions necessary for the de-restriction, the profile can be saved to the management server at stage 220. Although referred to as a singular "profile," the profile can be a group of profiles that each apply to a single device. The administrator can select an option to publish the profile group to the applicable devices, causing the management server to deliver the profiles to the relevant user devices at stage 230. This can occur upon enrollment with the management server and periodically thereafter. The user devices can save the profiles to a local memory store accessible by an agent application.

The agent application can enforce the profile and handle on-demand de-restrictions based on the profile. At stage 235, the agent application receives a request from the user to de-restrict a restricted resource of the user device. In some examples, the request can be received at a user interface associated with the agent application. The user can launch the agent application and navigate to a page that allows the user to request access to a restricted resource. That page of the agent application can list any restricted resources that are available for on-demand de-restricted. For example, that page of the agent application can list options such as "request call or SMS access," "request location services," and "request camera access," among others. FIG. 8 provides an illustration of such an example user interface.

In some examples, the request at stage 235 is requested by the user without first launching the agent application. For example, the user can attempt to access a restricted resource of the device and the agent application can display a window explaining that the resource is restricted. The window can also include an option for the user to request de-restriction. For example, the window can include a message that says "This resource is restricted. Click here to request a temporary de-restriction." If the user selects the option to de-restrict, the agent application can be launched and the user can be walked through the process of de-restriction. This process is shown further in FIG. 9.

At stage 240, the agent application can confirm any conditions necessary to de-restrict the requested resource. The conditions can relate to hardware aspects of the device, such as a condition requiring that the processor and memory chips within the user device have not been altered or replaced. The conditions can also relate to software aspects of the device, such as a condition requiring that the device include a certain version of an operating system or requiring that the device not include a hostile application. The conditions can also include a combination of hardware and software requirements, such as a set of conditions requiring that the battery level of the device is above a certain threshold and also requiring that the device includes a camera. The conditions can also relate to settings on the device, such as enabling location services for the device. In some circumstances, the agent application can perform actions to satisfy conditions automatically, without requiring user input. An example of such a circumstance includes turning on a software setting, such as enabling location services.

At stage 245, in response to receiving the request at stage 235 and confirming relevant conditions at stage 240, the agent application can de-restrict the resource. For example, the agent application can lift a restriction preventing the operating system from performing an action. In another example, the agent application can instruct the operating system to allow or perform an action that would otherwise not be allowed. The agent application can monitor usage of the de-restricted resource and impose any limitations on its use. For example, the agent application can de-restrict camera access but start a ten-minute timer that, upon expiration, causes the camera access to become restricted again.

At stage 250, the agent application can notify the management server about the de-restriction. The notification can include information identifying the de-restricted resource, the user and user device that requested access, the time and location of the user device at the time of the request, and information regarding usage of the resource. For example, if the requested resource was camera access, the notification can include information regarding the number of pictures or videos taken with the camera. In some examples, the pictures or videos themselves can be included in the notification. Similarly, if the requested resource was unrestricted WIFI access, the notification can include information regarding web locations accessed by the user device using the unrestricted WIFI access.

The notification at stage 250 can be provided to the management server, which can then send a notification to the administrator at stage 260. The notification at stage 260 can be identical to the notification at stage 250, or it can be an abbreviated version. For example, the notification sent to the administrator can merely indicate that access to a restricted resource, such as the camera, was requested. The administrator can then choose to gather more information by accessing information stored at the management server that was received at stage 250. The notification at stage 260 can also include historical data for the relevant user that is stored at the management server. For example, the notification can include previous requests for de-restriction (of either the same resource or a different resource) made by the same user. The notification can also include can also be generated as a result of the user surpassing a threshold number of requests within a predetermined period of time. For example, if the user requests de-restriction more than two times in a week, the management server can generate a notification at stage 260 specifying that information.

In some examples, the agent application can send a notification directly to the administrator, either additionally or in lieu of sending the notification to the management server. Further, the agent application or management server can also send a notification to the user, such as by delivering an email, SMS, or other message to the user. This can allow the user to keep track of their requests. If the user finds that they frequently request a certain resource, the user can request expanded access to that resource on a more permanent basis.

Figure 3:
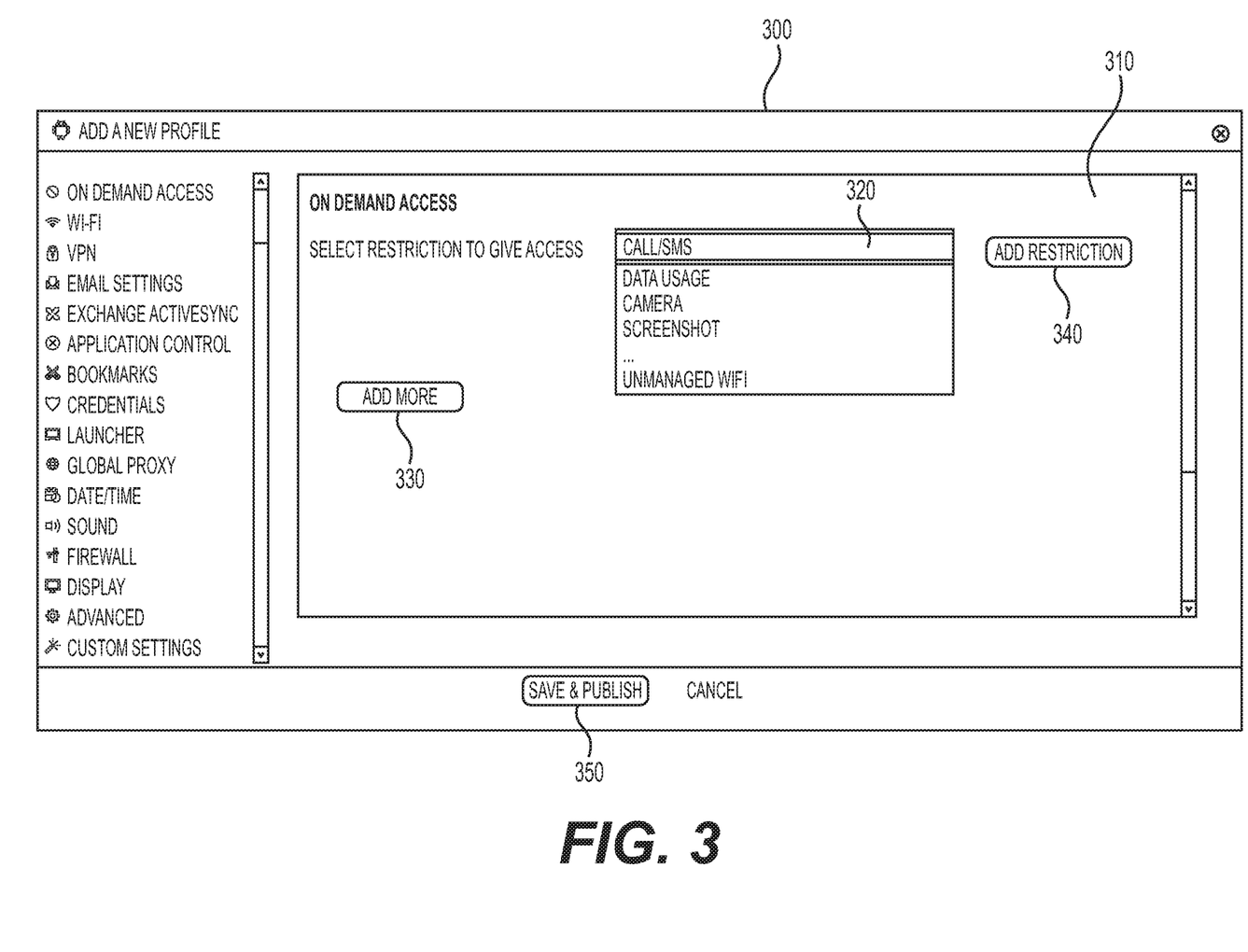
FIG. 3 is an illustration of an example user interface for configuring and deploying a profile for providing on-demand access to a restricted resource of a user device.

FIG. 3 provides an illustration of an example console 300 interface for configuring and deploying a profile for providing on-demand access to a restricted resource of a user device. An administrator can access the console 300 by, for example, navigating to a web location using a web browser on a computing device. The console 300 can also be provided as a standalone application on a computing device. The administrator can use the console 300 to perform various management activities, such as enrolling a user device, creating user groups, pushing device updates, and creating profiles for providing on-demand access to restricted resources.

In the example of FIG. 3, the console 300 is displaying a page 310 that allows a profile to be created for providing on-demand access to a restricted resource. The page 310 can include a menu 320 for selecting a "restriction" such as a restricted resource. The menu 320 can be a drop-down menu as shown in FIG. 3, or it can be displayed in a different form, such as a group of buttons that can be individually selected or a list of options with checkboxes next to each resource. The menu 320 can be populated with restrictions that are stored at the management server. In some examples, the administrator manually adds restrictions to the menu 320 by using an "add more" button 330. The "add more" button 330 can launch a window that includes a full listing of restrictions stored at the management server from which the administrator can choose to add to the menu 320.

In the example of FIG. 3, the displayed restricted resources are "Call/SMS," which can relate to a restriction on using cellular data to call or text, "Camera," which can relate to a restriction on the use of camera functionality, "screenshot," which can relate to a restriction preventing a user from taking a screenshot, and "unmanaged WIFI," which can relate to a restriction preventing a user device from sending or receiving data over an unmanaged WIFI network.

The administrator can select one or more of the restrictions listed in the menu 320 and select the "Add Restriction" button 340 to add the selected restrictions to a profile. In some examples, the administrator can only add one restriction at a time, configuring the details for each restriction before adding a new restriction. In other examples, the administrator can select multiple restrictions and the system will present configuration screens for each selected restriction. A "save and publish" button 350 can be used to save a profile and publish it to relevant devices once the profile is set up.

Figure 4:
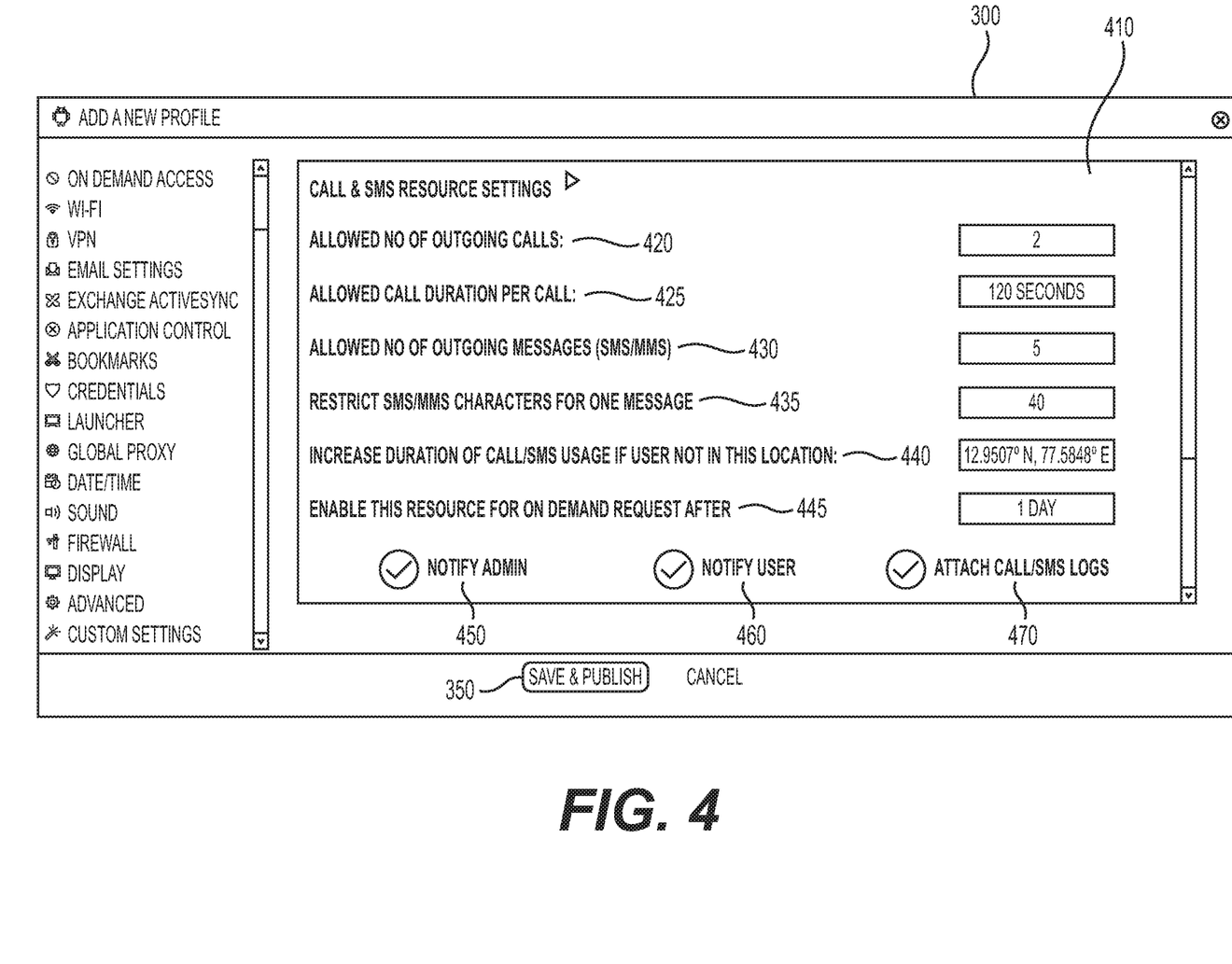
FIG. 4 is an illustration of an example user interface for configuring and deploying a profile for providing on-demand access to a restricted resource of a user device.

FIG. 4 provides an illustration of an example console 300 interface showing a second page 410 that can be displayed in response to selecting a first restriction on the previous page 310. In this example, the second page 410 relates to a restriction on calling and SMS resources. The second page 410 can include a variety of options specific to the restriction at issue. In the example of FIG. 4, a first option 420 allows the administrator to select an allowed number of outgoing calls. The first option 420 shows that the administrator has selected the number two for the first option 420, meaning that if calling is de-restricted on a device, the device will be able to make two calls before the call functionality is restricted again. Any number of calls can be selected for the first option 420.

Similarly, a second option 425 allows the administrator to select an allowed call duration per call. In this case, the administrator has selected 120 seconds, but any time period can be used. A third option 430 allows the administrator to select an allowed number of outgoing messages, such as SMS or MMS messages. In this example, the number has been set to five. After five messages have been sent, a restriction on messaging can be reinstated. A fourth option 435 allows the administrator to restrict the number of characters that can be sent in a single SMS or MMS message, which has been set to 40 here. A fifth option 440 can allow the administrator to increase the duration of allowed calling or SMS usage if a user is not in a certain location. The administrator can enter a zip code, latitude and longitude, or can select a button (not shown) that launches a map and allows the administrator to drop a pin or otherwise select a location from the map. Finally, a sixth option 445 allows the administrator to enable the resource for on-demand request after a time period has elapsed, such as one day.

The second page 410 can also include buttons that allow toggling of various features, such as a "Notify Admin" toggle 450 that causes a notification to be sent to the administrator when on-demand access to a resource is requested or granted. This functionality is described with respect to stage 260 of FIG. 2, for example. A "Notify User" toggle 460 can similarly cause a notification to be sent to the user when on-demand access to a resource is requested or granted. An "Attach Call/SMS Logs" toggle 470 can cause the agent application executing on the user device to include call or SMS logs in notifications sent to the management server, administrator, and/or user as a result of receiving on-demand access to a restricted resource.

Figure 5:
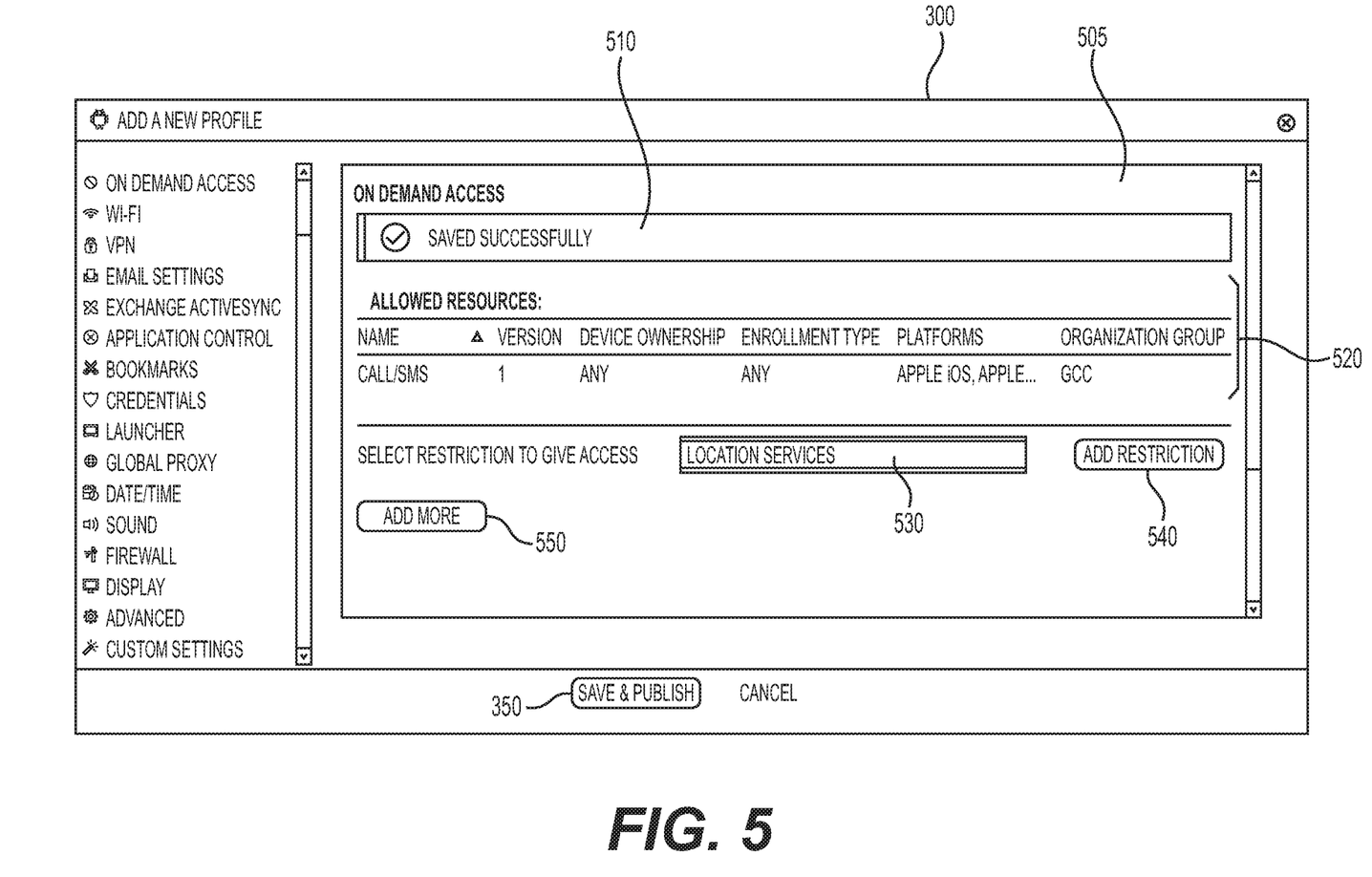
FIG. 5 is an illustration of an example user interface for configuring and deploying a profile for providing on-demand access to a restricted resource of a user device.

After completing the second page 410 of FIG. 4, the administrator can be directed back to an updated first page 505 as shown in FIG. 5. The updated first page 505 can include an indication 510 that the previous settings were saved successfully. A summary 520 of the on-demand access to the restricted resource can be provided on the page 505.

The summary 520 include the name of the resource, the version of the on-demand settings, device ownership requirements, enrollment requirements, platform requirements, and organization groups to which the profile applies.

From this page 505, the administrator can select certain items within the summary 520 to change. For example, under "device ownership," the administrator can select between "Any," "Employee Owned," and "Enterprise Owned." Similarly, an enrollment type can be specified or all types can be included. Under "Platforms," the administrator can select operating systems to which the profile applies. And under "Organization Group," the administrator can select one or more user groups stored at the management server, as explained previously. The updated first page 505 can also include a menu 530, "Add Restriction" button 540, and "Add More" button 550 corresponding to the elements 320, 340, and 330, respectively, discussed with respect to FIG. 3.

Figure 6:
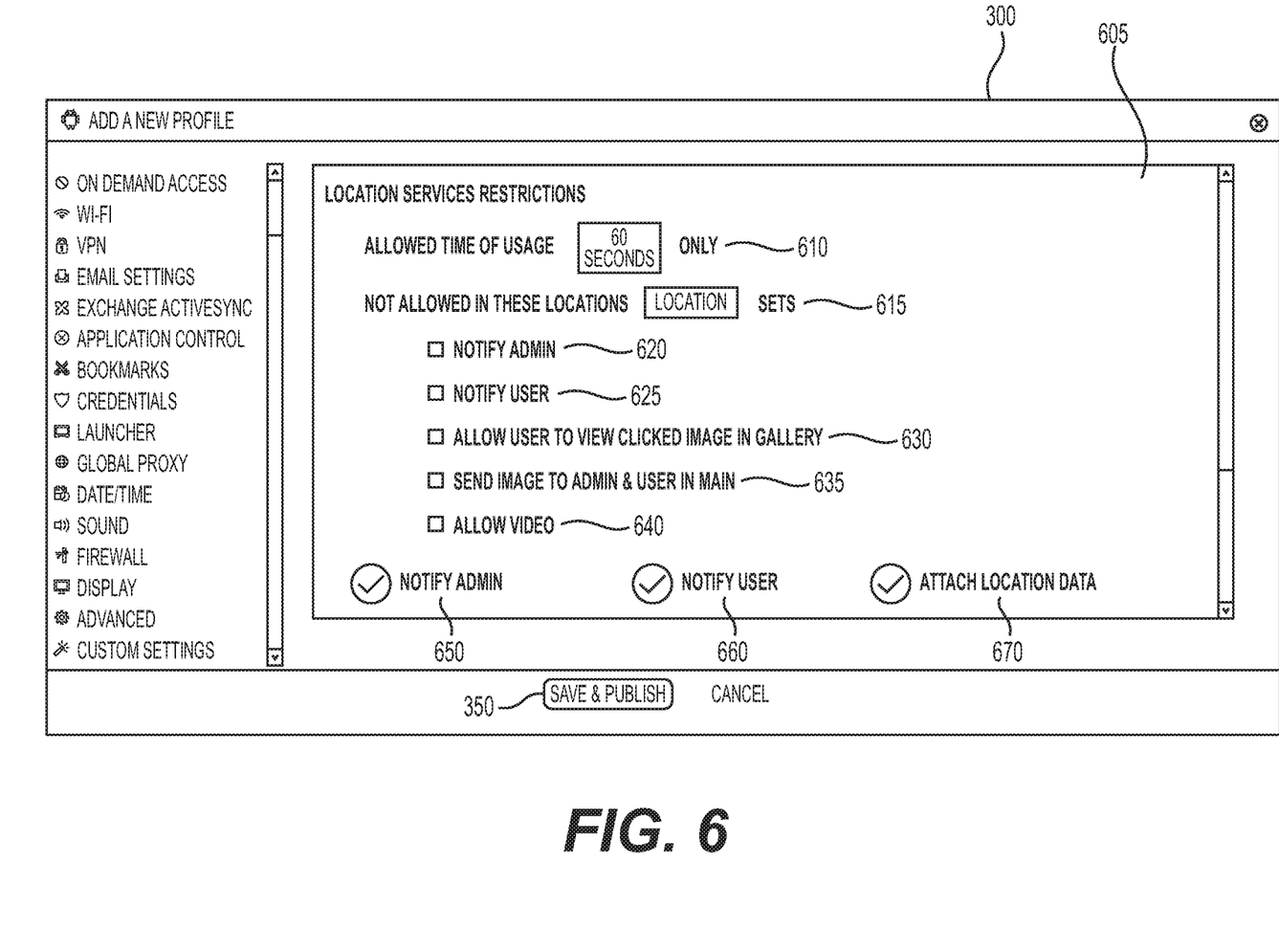
FIG. 6 is an illustration of an example user interface for configuring and deploying a profile for providing on-demand access to a restricted resource of a user device.

FIG. 6 provides an illustration of the example console 300 interface showing a third page 605 that can be displayed in response to selecting a second restriction on the updated first page 505. In this example, the third page 605 relates to a restriction on location services. A first location option 610 allows the administrator to select an amount of time (here, 60 seconds) to which the location services are allowed to be used once de-restricted. A second location option 615 allows the administrator to select one or more locations at which the location services are not allowed to be used. A third location option 620 allows the administrator to receive a notification when a request is made for de-restricting location services, while a fourth location option 625 provides a similar notification to the user. These options can differ from the "Notify Admin" option 650 and "Notify User" option 660, which can relate to notifying after the resource has been utilized in a de-restricted state.

A fifth location option 630 can allow the user to view a clicked image in a gallery. A sixth location option 635 can cause the agent application to send the clicked image to the administrator and user. A seventh location option 640 can allow the user to access video that requires the location-services resource to be de-restricted. Finally, an "Attach Location Data" toggle 670 can be selected, causing any notifications send to the administrator, user, or management server to include location data.

Figure 7:
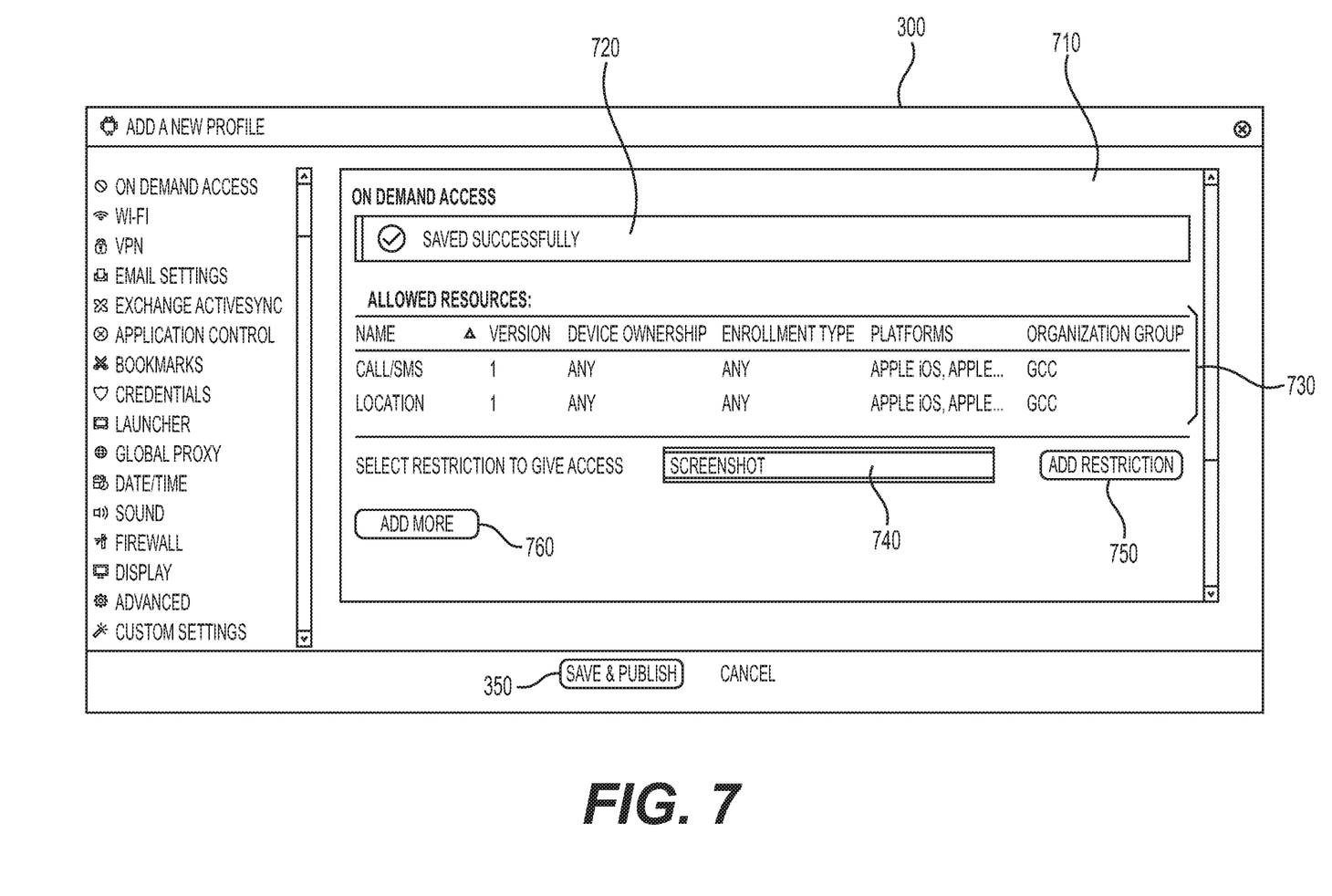
FIG. 7 is an illustration of an example user interface for configuring and deploying a profile for providing on-demand access to a restricted resource of a user device.

After finishing the configuration of option on the third page 605 of FIG. 6, the administrator can be directed back to an updated first page 710 as shown in FIG. 7. The updated first page 710 of FIG. 7 is similar to that shown in FIG. 5, with the addition of a new "Location" restriction listed in the summary 730 of the allowed resources. The page 710 can disclose an indication 720 that the previous settings were saved successfully. The updated first page 710 can also include a menu 740, "Add Restriction" button 750, and "Add More" button 760 corresponding to the elements 320, 340, and 330, respectively, discussed above with respect to FIG. 3.

While FIGS. 3-7 depict illustrations of a user interface that an administrator can use to establish a profile, FIGS. 8 and 9 depict illustrations of a user interface 800 presented to a user requesting on-demand access to a restricted resource. The user interface 800 of FIG. 8 can be displayed by an agent application executing on the user device, for example. The agent application can display an "Access Restricted Resource" option that, once selected, presents a list of resources that can be requested underneath a header 810. In this example, the user is presented with options to request call or SMS access 820, request unmanaged WIFI access 830, request location services 840, request additional mobile data 850, request camera access 860, or request BLUETOOTH access 870. This list can be populated by the agent application based on resources specified in the profile stored on the device.

When a user requests a resource by selecting a graphical element associated with the resource, such as call or SMS access 820, the agent application can present a new page under the same heading 810 that includes information for enabling the resource. For example, an indication 920 can explain to the user that in order to enable the requested resource, conditions must first be satisfied.

A first set of conditions 930 can list any conditions requiring manual enabling or disabling by the user. In this example no such conditions exist. But in some examples, the user may be required to delete an unauthorized application or complete an enrollment process to enable the resource. A second set of conditions 940 can list any changes that the agent application will automatically make as a result of finalizing the resource request. In this example, the second set of conditions 940 includes a notification that the agent application will automatically (1) enable location services if not already enabled and (2) send the telecom data to the administrator. The notification can also indicate that (3) the administrator might charge the user for the call or SMS, depending on the company rules.

An explanation 950 can be provided on the user interface, providing information regarding the de-restriction of the resource. In this example, the explanation 950 explains how the user can enable the permissions when prompted, that the call/SMS functionality will only be available for 120 seconds, and that the user can click an "Agree and Enable" button 960 to de-restrict the resource for the specified amount of time. The information provided in the explanation 950 can be tailored to the specific permission being granted.

FIG. 10 provides an illustration of an example system configured to carry out the various methods discussed above. The system can include a console 1100 at which an administrator can access a management server 1200. The console 1100 can be a user interface, such as those illustrated in FIGS. 3-7. The console 1100 can be displayed by a computing device as a result of the administrator navigating to a web location that provides the console 1100 or launching an application that includes the console 1100.

The management server 1200 can be a network of servers, some of which can be located remotely from one another. In another example, the management server 1200 is a single server with multiple purposes. In yet another example, the management server 1200 can be one or more servers dedicated to the operations described herein. The management server can include one or more profiles 1210 stored locally in a database 1220 or stored remotely. The profiles 1210 can correspond to the profiles generated and transmitted as discussed with respect to stage 110 of FIG. 1 and stages 220 and 230 of FIG. 2. The profiles 1210 can be created by an administrator via the user interfaces depicted by FIGS. 3-7, for example. The profiles 1210 can include an identification the user or user devices to which the profile 1210 applies, a listing of restricted resources that are eligible to be de-restricted, any conditions or limitations on the de-restriction, and any other relevant details discussed in this disclosure. A user device 1300 can receive and store a profile 1210 relevant to that user device 1300, as depicted by the de-restriction profile 1320 in FIG. 10.

The management server 1200 can also include various components for enrollment and compliance monitoring and enforcement. As part of the enrollment process, the management server 1200 can cause an agent application 1310 to be installed on the user device 1300. The agent application 1310 can be a portion of an operating system for the device 1300, or it can operate in the application layer of the device 1300. For example, the agent application 1310 can be a dedicated application or other software that can monitor and manage data, software components, and hardware components associated with the user device 1300. The agent application 1310 can monitor and control functionality and other managed applications on the user device 1300. The agent application 1310 installed on the user device 1300 can include functionality for utilizing components specific to the user device 1300, such as a GPS sensor, accelerometer, or gyroscope.

The agent application 1310 can be an application, or portion of an application, that provides functionality beyond simply monitoring and managing resources in the user device 1300. In one example, a developer can use an SDK to insert security libraries into a managed application that can communicate with the agent application 1310. In another example, a developer can incorporate libraries and other components through a process of "wrapping." To wrap an application, a developer can decompile the application, insert the libraries or other components, and then recompile the application. When a library is incorporated into an application, the functionality provided by the library can be called by the agent application 1310 executing in the user device 1300. For example, if a security library provides the ability to monitor and enable or disable functionality provided by a managed application, the agent application 1310 can call functions provided by the library to monitor and enable or disable the functionality.

As mentioned above, the management server 1200 can include components for enrolling the user device 1300 and confirming compliance. With respect to enrollment, the management server 1200 can include an enrollment component 1230 and an administrator component 1240, either or both of which can be used for the process of enrolling a user device 1300. For example, the use device 1300 can communicate with the enrollment component 1230 during the initial stages of enrollment. In some examples, the enrollment component 1230 can provide a token to the user device 1300 indicating that the device 1300 has been authenticated and is permitted to communicate and enroll with the management server 1200. The management server 1200 or enrollment component 1230 can provide the user device 1300 with information regarding how to access and communicate with the administrator component 1240 to continue the enrollment process.

In some examples, the administrator component 1240 can request a token from the user device 1300, indicating that the user device 1300 has been authenticated and is permitted to continue the enrollment process with the administrator component 1240. Upon receiving the token, the administrator component 1240 can continue the enrollment process. The administrator component 1240 can also provide a console for an administrator to configure and monitor the status of the user device 1300 and the enrollment process. In some examples, the administrator component 1240 can be dedicated to a particular enterprise or group of enterprises, while the enrollment component 1230 can be shared across multiple different enterprises.

The management server 1200 can also include compliance rules 1250. A compliance rule 1250 can set forth one or more conditions that must be satisfied in order for a user device 1300 to be deemed compliant. If compliance is broken, the management server 1200 can take steps to control access of the user device to enterprise files, applications, and email. Compliance rules 1250 can be assigned differently to the different organizational groups. In addition, compliance rules 1250 can be assigned differently to different devices assigned to the same user. Compliance rules 1250 can provide access to enterprise files to the user device 1300 based on the user's organization group or other criteria. Meanwhile, compliance rules 1250 can cause the user device 1300 to be wiped if it leaves a geographic area, is jailbroken, or if the agent application 1310 is removed or disabled.

In some examples, a compliance rule 1250 can specify one or more triggering conditions. If a triggering condition occurs, the system can react accordingly. For example, the management server 1200 can automatically perform one or more remedial actions. In another example, the management server 1200 can prompt an administrator to take one or more remedial actions. In some cases, remedial actions can be staged, such that the user of a user device 1300 is provided with a chance to remedy their noncompliance before being subjected to stricter remedial actions.

In some examples, compliance rules 1250 can be used to form a "condition" for a resource to be de-restricted. In a first example, a condition is synonymous with a compliance rule 1250. In that example, the condition is met when the compliance rule 1250 is satisfied, and similarly, the condition is not met when the compliance rule 1250 is not satisfied. In some examples, a condition can require satisfying multiple compliance rules. A condition can require that two compliance rules be satisfied, or that three out of four compliance rules be satisfied, as examples.

In an example where a compliance rule 1250 is determined to be not satisfied, one or more remedial actions can be caused to occur with or without acceptance from the end user of the device. In one example, a remedial action can be taken by the agent application 1310 based on determining that a compliance rule 1250 is not satisfied. This can occur even though the check of the compliance rule 1250 was for the purpose of determining whether a condition for de-restricting a resource was met. The agent application 1310 can provide a prompt for the user to accept the remedial action. Alternatively or additionally, the agent application 1310 can simply take a remedial action without notifying the user.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A method for providing on-demand access to restricted resources of a user device, comprising:
   generating a profile at a management server, the profile specifying:
   a restricted resource of the user device;
   a condition for the restricted resource to be de-restricted;

a usage limitation including at least one of a time limit on de-restricted use and a limit on permitted implementations of the restricted resource; and a communication preference to notify a respective user of the user device with specified usage information associated with at least one of a de-restriction request and a restricted resource usage; and causing the profile to be transmitted to the user device, the user device executing an agent application on the user device that:

determines that a user of the user device is requesting a de-restriction of the restricted resource;

causes the user device to display, on a graphical user interface (GUI), an informational page relating to the requested de-restriction, wherein the informational page includes:

an indication of whether any manual actions are required to be performed by the user in order to de-restrict the resource, and if so, a description of the required manual actions;

an indication of at least one action to be performed automatically by the agent application in order to de-restrict the resource;

an indication of the usage limitation regarding the restricted resource; and a selection element that, when selected by the user, enables the agent application to perform the at least one automatic action to de-restrict the restricted resource;

confirms that the condition is satisfied;

de-restricts the restricted resource on the user device and imposes the usage limitation;

transmits a first notification to the management server regarding the de-restriction, the first notification including information regarding an actual usage of the restricted resource during a period of the de-restriction; and causes, based on the communication preference, a second notification to include the specified usage information and be transmitted to the respective user.

2. The method of claim 1, further comprising:

tracking, with at least one of the agent application and the management server, de-restriction requests by the user; and generating, by one of the agent application and the management server, the second notification to include a number of the de-restriction requests for a predetermined period of time.

3. The method of claim 1, wherein the agent application causes the second notification to be sent to the administrator, and wherein the specified information describes the actual usage of the restricted resource for the de-restriction.

4. The method of claim 1, wherein the condition for the restricted resource to be de-restricted is displayed on the user device by the agent application.

5. The method of claim 4, wherein the agent application displays a visual indication of whether the condition is currently met.

6. The method of claim 1, wherein the agent application presents an agreement to which the user must agree before the agent application de-restricts the restricted resource.

7. A non-transitory, computer-readable medium comprising instructions that, when executed by a processor of a computing device, cause the computing device to perform stages for providing on-demand access to restricted resources of a user device, the stages comprising:

generating a profile at a management server, the profile specifying:

a restricted resource of the user device;

a condition for the restricted resource to be de-restricted;

a usage limitation including at least one of a time limit on de-restricted use and a limit on permitted implementations of the restricted resource; and a communication preference to notify a respective user of the user device with specified usage information associated with at least one of a de-restriction request and a restricted resource usage; and causing the profile to be transmitted to the user device, the user device executing an agent application on the user device that:

determines that a user of the user device is requesting de-restriction of the restricted resource;

causes the user device to display, on a graphical user interface (GUI), an informational page relating to the requested de-restriction, wherein the informational page includes:

an indication of whether any manual actions are required to be performed by the user in order to de-restrict the resource, and if so, a description of the required manual actions;

an indication of at least one action to be performed automatically by the agent application in order to de-restrict the resource;

an indication of the usage limitation regarding the restricted resource; and a selection element that, when selected by the user, enables the agent application to perform the at least one automatic action to de-restrict the restricted resource;

confirms that the condition is satisfied;

de-restricts the restricted resource on the user device and imposes the usage limitation;

transmits a first notification to the management server regarding the de-restriction, the first notification including information regarding an actual usage of the restricted resource during a period of the de-restriction; and causes, based on the communication preference, a second notification to include the specified usage information and be transmitted to the respective user.

8. The non-transitory, computer-readable medium of claim 7, wherein the agent application further comprising:

tracking, with at least one of the agent application and the management server, de-restriction requests by the user; and generating, by one of the agent application and the management server, the second notification to include a number of the de-restriction requests for a predetermined period of time.

9. The non-transitory, computer-readable medium of claim 7, wherein the agent application causes the second notification to be sent to an administrator, and wherein the specified information describes the actual usage of the restricted resource for the de-restriction.

10. The non-transitory, computer-readable medium of claim 7, wherein the condition for the restricted resource to be de-restricted is displayed on the user device by the agent application.

11. The non-transitory, computer-readable medium of claim 10, wherein the agent application displays a visual indication of whether the condition is currently met.

12. The non-transitory, computer-readable medium of claim 7, wherein the agent application presents an agreement to which the user must agree before the agent application de-restricts the restricted resource.

13. A system for providing on-demand access to restricted resources of a user device, comprising
a computing device comprising a processor;
a memory store comprising a non-transitory, computer-readable medium having instructions that, when executed by the processor, cause the processor to perform stages comprising:
generating a profile at a management server, the profile specifying:
a restricted resource of the user device;
a condition for the restricted resource to be de-restricted;
a usage limitation including at least one of a time limit on de-restricted use and a limit on permitted implementations of the restricted resource; and
a communication preference to notify a respective user of the user device with specified usage information associated with at least one of a de-restriction request and a restricted resource usage; and
causing the profile to be transmitted to the user device, the user device an agent application on the user device that:
determines that a user of the user device is requesting de-restriction of the restricted resource;
causes the user device to display, on a graphical user interface (GUI), an informational page relating to the requested de-restriction, wherein the informational page includes:
an indication of whether any manual actions are required to be performed by the user in order to de-restrict the resource, and if so, a description of the required manual actions;
an indication of at least one action to be performed automatically by the agent application in order to de-restrict the resource;
an indication of the usage limitation regarding the restricted resource; and
a selection element that, when selected by the user, enables the agent application to perform the at least one automatic action to de-restrict the restricted resource;
confirms that the condition is satisfied;
de-restricts the restricted resource on the user device;
transmits a first notification to the management server regarding the de-restriction, the first notification including information regarding an actual usage of the restricted resource during a period of the de-restriction; and
causes, based on the communication preference, a second notification to include the specified usage information and be transmitted to the respective user.

14. The system of claim 13, wherein the agent application further comprising:
tracking, with at least one of the agent application and the management server, de-restriction requests by the user; and
generating, by one of the agent application and the management server, the second notification to include a number of the de-restriction requests for a predetermined period of time.

15. The system of claim 13, wherein the agent application causes the second notification to be sent to an administrator, and wherein the specified information describes the actual usage of the restricted resource for the de-restriction.

16. The system of claim 13, wherein the condition for the restricted resource to be de-restricted is displayed on the user device by the agent application.

17. The system of claim 16, wherein the agent application displays a visual indication of whether the condition is currently met.

* * * * *